US012744738B2

(12) United States Patent
Uniyal

(10) Patent No.: US 12,744,738 B2
(45) Date of Patent: Sep. 22, 2026

(54) ONE-WAY VOICE CALL DETECTION

(71) Applicant: Boost SubscriberCo L.L.C., Englewood, CO (US)

(72) Inventor: Manish Uniyal, Parker, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 175 days.

(21) Appl. No.: 18/142,709

(22) Filed: May 3, 2023

(65) Prior Publication Data

US 2024/0372813 A1 Nov. 7, 2024

(51) Int. Cl.

| | |
|---|---|
| ***H04L 47/2416*** | (2022.01) |
| ***H04L 43/08*** | (2022.01) |
| ***H04L 47/28*** | (2022.01) |
| ***H04L 65/80*** | (2022.01) |

(52) U.S. Cl.

CPC .......... *H04L 47/2416* (2013.01); *H04L 43/08* (2013.01); *H04L 47/28* (2013.01); *H04L 65/80* (2013.01)

(58) Field of Classification Search

None

See application file for complete search history.

(56) References Cited

U.S. PATENT DOCUMENTS

2014/0122933 A1* 5/2014 Wang .................. G06F 11/0709 714/37
2016/0142931 A1* 5/2016 Mondal ............... H04L 41/0631 370/252
2017/0251031 A1* 8/2017 Lehesaari ............... H04L 65/80
2017/0353598 A1* 12/2017 Cho .................... H04M 3/2236
2018/0152362 A1* 5/2018 Sanders .............. H04L 43/0811
2018/0262622 A1* 9/2018 Wang .................... H04M 7/006
2020/0204599 A1* 6/2020 Ravichandran ..... H04L 65/1104
2022/0191266 A1* 6/2022 Rahman .................. H04L 65/10

OTHER PUBLICATIONS

[No Author Listed], "Delivering Quality VoLTE services," RADCOM, Jun. 2020, 13 pages.

(Continued)

*Primary Examiner* — Tonia L Dollinger
*Assistant Examiner* — Ishrat Rashid
(74) *Attorney, Agent, or Firm* — Lowenstein Sandler LLP

(57) ABSTRACT

Methods, systems, and apparatus, including computer programs encoded on computer storage media, for detection of one-way calls. One of the methods includes receiving information pertaining to voice data packets exchanged for an audio call between a first mobile device and a second mobile device connected over a cellular network. The information is captured using a packet probe device configured to monitor data transfer between a first network device and a second network device of the cellular network. The method further includes identifying that a first flow of voice data packets is disrupted over a particular time period of a threshold duration, and a second flow of voice data packets is substantially undisrupted over the particular time period; identifying the particular time period as a one-way audio period; and altering at least one parameter of the cellular network based at least on the identification of the one-way audio period.

16 Claims, 5 Drawing Sheets

(56) References Cited

OTHER PUBLICATIONS

[No Author Listed], "Digital cellular telecommunications system (Phase2+) (GSM); Universal Mobile Telecommunications System (UMTS); LTE; IP Multimedia Subsystem (IMS); Stage 2," ETSI, Aug. 2018, 15.3.0:1-324.

[No Author Listed], "Managing Voice, Video Call Quality Issues in Contact Centers with the nGeniusONE Service Assurance Platform," NETSCOUT, Jan. 2019, 7 pages.

[No Author Listed], "VoLTE Troubleshooting: Protect the Customer Experience with Iris Session Analyzer," NETSCOUT, Mar. 2017, 5 pages.

Stuhlfauth, "5G Voice over New Radio (VoNR)," Rohde & Schwarz, Mar. 2021, 57 pages.

* cited by examiner

400

402 404 406 410 408 412

| TIME STAMP | Transmitted Packet | Received Packet | Tx Packet Loss (%) | Rx Packet Loss (%) | Jitter (ms) |
|---|---|---|---|---|---|
| 2022-04-07 12:31:55.000000 | 294 | 1404 | 0 | 0 | 4.32 |
| 2022-04-07 12:31:56.000000 | 783 | 1457 | 0 | 0 | 4.02 |
| 2022-04-07 12:31:57.000000 | 690 | 1464 | 0 | 0 | 4.51 |
| 2022-04-07 12:31:58.000000 | 36 | 1650 | 0 | 0 | 6.14 |
| 2022-04-07 12:31:59.000000 | 36 | 1617 | 0 | 0 | 7.02 |
| 2022-04-07 12:32:00.000000 | 783 | 1683 | 0 | 0 | 6.67 |
| 2022-04-07 12:32:01.000000 | 651 | 1590 | 0 | 0 | 6.66 |
| 2022-04-07 12:32:02.000000 | 42 | 1650 | 0 | 0 | 7.56 |
| 2022-04-07 12:32:03.000000 | 843 | 1173 | 0 | 0 | 7.06 |
| 2022-04-07 12:32:04.000000 | 1650 | 741 | 0 | 0 | 6.84 |
| 2022-04-07 12:32:05.000000 | 1617 | 774 | 0 | 0 | 4.81 |
| 2022-04-07 12:32:06.000000 | 1683 | 36 | 0 | 0 | 4.65 |
| 2022-04-07 12:32:07.000000 | 1623 | 36 | 0 | 0 | 3.69 |
| 2022-04-07 12:32:08.000000 | 1650 | 42 | 0 | 0 | 4.24 |
| 2022-04-07 12:32:09.000000 | 1617 | 36 | 0 | 0 | 3.85 |
| 2022-04-07 12:32:10.000000 | 1683 | 36 | 0 | 0 | 3.47 |
| 2022-04-07 12:32:11.000000 | 0 | 36 | 0 | 0 | 3.46 |
| 2022-04-07 12:32:12.000000 | 0 | 1458 | 0 | 0 | 4.77 |
| 2022-04-07 12:32:13.000000 | 0 | 1650 | 0 | 0 | 4.66 |
| 2022-04-07 12:32:14.000000 | 0 | 1650 | 0 | 0 | 5.2 |
| 2022-04-07 12:32:15.000000 | 0 | 1683 | 0 | 0 | 6.6 |
| 2022-04-07 12:32:16.000000 | 366 | 1584 | 0 | 0 | 7.59 |
| 2022-04-07 12:32:17.000000 | 36 | 1650 | 0 | 0 | 6.45 |
| 2022-04-07 12:32:18.000000 | 690 | 1716 | 0 | 0 | 6.55 |
| 2022-04-07 12:32:19.000000 | 1175 | 1530 | 0 | 0 | 6.85 |
| 2022-04-07 12:32:20.000000 | 1617 | 1167 | 0 | 0 | 5.86 |
| 2022-04-07 12:32:21.000000 | 1650 | 135 | 0 | 0 | 4 |
| 2022-04-07 12:32:22.000000 | 1437 | 789 | 0 | 0 | 3.56 |
| 2022-04-07 12:32:23.000000 | 1365 | 1107 | 0 | 0 | 4.96 |
| 2022-04-07 12:32:24.000000 | 1617 | 729 | 0 | 0 | 2.5 |

FIG. 4

ONE-WAY VOICE CALL DETECTION

TECHNICAL FIELD

This specification relates to cellular networks.

BACKGROUND

Voice calls in cellular networks can be implemented as end-to-end Voice over IP (VOIP) connections managed by an IP Multimedia Subsystem (IMS). User experience is negatively impacted when Real-time Transport Protocol (RTP) packets carrying VoIP data fail to be transferred between devices.

SUMMARY

In general, aspects of the subject matter described in this specification can be embodied in methods that include receiving information pertaining to voice data packets exchanged for an audio call between a first mobile device and a second mobile device connected over a cellular network. The information pertaining to the voice data packets is captured using a packet probe device configured to monitor data transfer between a first network device and a second network device of the cellular network. The methods include analyzing the information pertaining to the voice data packets to obtain (i) a set of first metrics characterizing a first flow of voice data packets from the first mobile device to the second mobile device and (ii) a set of second metrics characterizing a second flow of voice data packets from the second mobile device to the first mobile device. The methods include, based at least on a subset of the first metrics and a subset of the second metrics, identifying that the first flow of voice data packets is disrupted over a particular time period of a threshold duration, and the second flow of voice data packets is substantially undisrupted over the particular time period. The methods include identifying the particular time period as a one-way audio period, and altering at least one parameter of the cellular network based at least on the identification of the one-way audio period.

These and other methods described herein can have one or more of at least the following characteristics.

In some implementations, the first network device is included in a core system of the cellular network, and the second network device is included in a multimedia subsystem.

In some implementations, the core system includes a 5G core, and the multimedia subsystem includes an IP Multimedia Subsystem (IMS).

In some implementations, the packet probe device is configured to monitor the data transfer at a call session function control (CSCF) of the IMS.

In some implementations, the packet probe device is disposed between the 5G core and the IMS.

In some implementations, the threshold duration is between two seconds and five seconds.

In some implementations, the first metrics and the second metrics are aligned in time, and identifying the particular time period as the one-way audio period is based on at least the time-aligned first metrics and second metrics.

In some implementations, the at least one parameter of the cellular network altered based on the identification of the particular time period as the one-way audio period includes at least one of: a radio link failure timer, a radio resource control (RRC) reestablishment rate, a handover parameter, or a codec selection.

In some implementations, the information pertaining to the voice data packets includes at least one of: metadata of the voice data packets, data within the voice data packets, or routing data associated with the voice data packets.

In some implementations, during the particular time period, zero voice data packets flow from the first mobile device to the second mobile device, and at least one voice data packet flows from the second mobile device to the first mobile device.

In some implementations, the methods include receiving log data obtained in a drive test, the log data including information about the first flow of data packets and the second flow of data packets; based at least on the log data, identifying the particular time period as the one-way audio period. Analyzing the information pertaining to the voice data packets is performed in response to identifying the particular time period as the one-way audio period based at least on the log data, and the information pertaining to the voice data packets includes protocol-level signaling data that is unavailable in the log data obtained in the drive test. The methods include determining, based at least on the protocol-level signaling data, the at least one parameter of the cellular network to be altered.

In some implementations, analyzing the information pertaining to the voice data packets includes filtering voice packet data on one or more protocols.

In some implementations, the information pertaining to the voice data packets includes at least one voice data packet in PCAP format.

In some implementations, the protocol-level signaling data includes one or more of stream control transmission protocol (SCTP) data; F1AP/radio resource control (RRC) data; NG application protocol (NGAP) data; or non-access-stratum for 5G (NAS-5GS) data.

Some aspects of this disclosure can be embodied in methods that include receiving log data including information pertaining to voice data packets exchanged for an audio call between a first mobile device and a second mobile device connected over a cellular network. The log data is obtained in a drive test in which mobile test equipment is navigated about an area during the audio call. The methods include analyzing the log data to obtain (i) a set of first metrics characterizing a first flow of voice data packets from the first mobile device to the second mobile device and (ii) a set of second metrics characterizing a second flow of voice data packets from the second mobile device to the first mobile device; based at least on a subset of the first metrics and a subset of the second metrics, identifying that the first flow of voice data packets is disrupted over a particular time period of a threshold duration, and the second flow of voice data packets is substantially undisrupted over the particular time period; identifying the particular time period as a one-way audio period; in response to identifying the particular time period as the one-way audio period, obtaining at least one voice data packet exchanged for the audio call, the at least one voice data packet captured using a packet probe device configured to monitor data transfer between a first network device and a second network device of the cellular network; analyzing the at least one voice data packet to obtain protocol-level signaling data that is unavailable in the log data; and altering at least one parameter of the cellular network based at least on the protocol-level signaling data.

Implementations of these and other aspects include corresponding computer systems, apparatus, and computer programs recorded on one or more computer storage devices, each configured to perform the actions of the methods.

The subject matter described in this specification can be implemented in particular embodiments so as to realize one or more of the following advantages. One-way call events can be identified more reliably and precisely (e.g., in comparison, for example, to UE-reported one-way call events) based on comparison of uplink/downlink packet streams and/or based on a probing method of obtaining packet data. Based on identification of one-way call events, cellular network parameters can be adjusted to decrease future occurrence of one-way calls.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a diagram illustrating an example of cellular network data that is processed in accordance with some implementations of the present disclosure.

Like reference numbers and designations in the various drawings indicate like elements.

DETAILED DESCRIPTION

Figure 1:
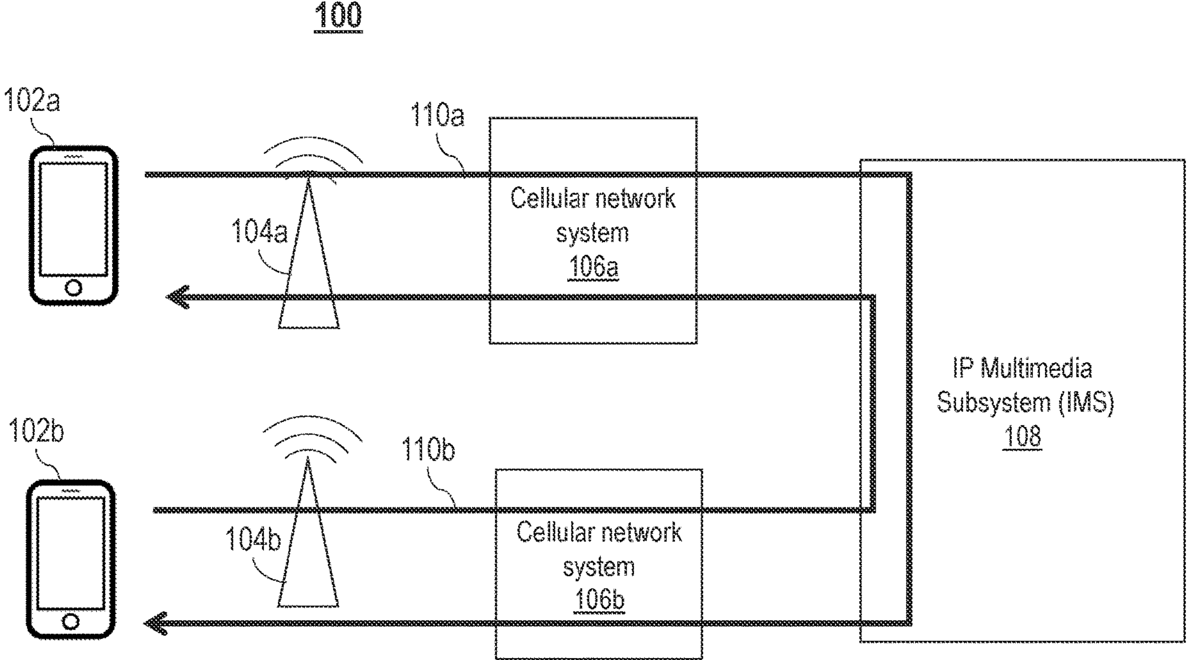
FIG. 1 is a diagram illustrating routing of a voice call in a cellular network.

In some cellular networks, voice calls can be mediated by an IP Multimedia Subsystem (IMS) that interfaces with the cellular network core. FIG. 1 shows an example of an environment 100 in which a voice call is occurring between a first user device/equipment (UE) 102*a* and a second UE 102*b*. The UE 102*a*, 102*b* can include, for example, a mobile phone, a tablet, a laptop, a wearable smart device, or any other device (e.g., mobile device) operable to access a cellular network.

The UE 102*a*, 102*b* exchange voice data packets through the cellular network to execute the voice call. A first flow of cellular packets 110*a* (e.g., Real-Time Transport Protocol (RTP) packets), carrying voice data from the first UE 102*a* to the second UE 102*b*, is transmitted from the first UE 102*a* to a first base station 104*a* (e.g., a 4G LTE Base Station or a 5G gNB), to a first cellular network system (e.g., a cellular network core) 106*a* (e.g., a 4G/LTE core network or a 5G core), to an IMS 108, to a second cellular network system 106*b*, to a second base station 104*b*, and to the second UE 102*b*. A second flow of cellular packets 110*b* is sent on the opposite route as shown. In some cases, one or more of the illustrated elements may be the same. For example, the two UE 102*a*, 102*b* may be served by the same base station and/or by the same cellular network system. The cellular network systems 106*a*, 106*b* are systems that handle back-end network tasks such as packet routing, internet connectivity, device authentication, user mobility tracking, and/or subscriber usage.

A continuous audio call with good user experience relies on the two flows of cellular packets 110*a*, 110*b* remaining uninterrupted. Stoppages, degradations, and other disruptions in the flows 110*a*, 110*b* can be classified into various types based on the durations and extents of the stoppages. A complete disruption of both flows 110*a*, 110*b*—which may require initiation of a new audio call—is referred to as a "dropped call." A temporary halt to or other disruption of both flows 110*a*, 110*b*, corrected within a single call, is referred to as "muting." These events, familiar to any mobile phone user, are the subject of various identification and remediation efforts.

"One-way audio calls" are calls in which packet loss leading to serious disruption or even stoppage of flows occurs in only one direction. In the example of FIG. 1, a one-way audio call situation can occur if the first flow of cellular packets 110*a* does not successfully reach the second UE 102*b*, but the first UE 102*a* does receive the second flow of cellular packets 110*b*. This event, which can occur at the beginning of a call or midway through an existing call, is experienced as a loss of voice from one side of the call for a period of time.

Various network events can cause one-way calls. Radio link failure (RLF) refers to a variety of events in which the radio link is degraded, e.g., due to a coverage issue. RLF subsequently can be corrected in a radio link reestablishment procedure; in some cases, the period between RLF and reestablishment may be a one-way audio call. Handover (HO) problems result when UE travels from one coverage area to another; these may result in one-way loss of packet flow. As another example, UE may employ a codec that (i) does not match the codec used by a corresponding network and/or (ii) is ill-suited to current network conditions, e.g., is incompatible with current low signal quality. The use of the wrong codec may also cause a one-way audio call.

Figure 2:
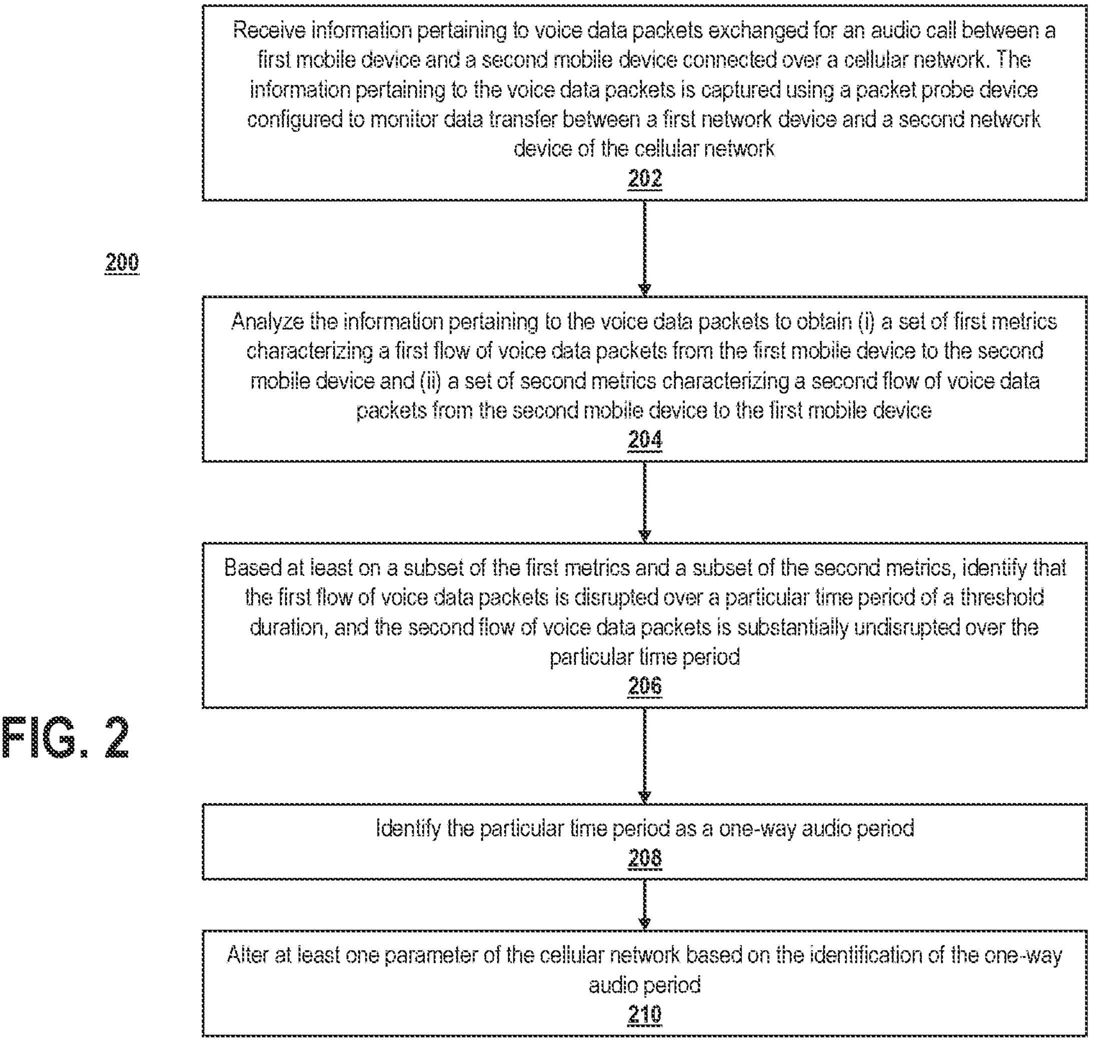
FIG. 2 is a diagram illustrating an example of a process according to some implementations of the present disclosure.

Some implementations according to the present disclosure identify one-way audio calls by probing cellular packet flows. FIG. 2 is a flowchart of an example of a process for identifying one-way audio calls. For convenience, the process 200 will be described as being performed by a system of one or more computers, located in one or more locations, and programmed appropriately in accordance with this specification. For example, as described in further detail below, one or more components of the cellular network systems 106*a*/106*b*, one or more components of the IMS 108, one or more probes between the cellular network systems 106*a*/106*b* and the IMS 108, one or more other probes, and/or one or more other cellular network modules, appropriately programmed and/or interconnected, can perform some or all of the process 200.

The process 200 includes receiving information pertaining to voice data packets exchanged for an audio call between a first mobile device and a second mobile device connected over a cellular network (202). The information pertaining to the voice data packets is captured using a packet probe device configured to monitor data transfer between a first network device and a second network device of the cellular network.

The packet probe device can monitor the data transfer in one or more network locations and using one or more methods. For example, in some implementations, one or more network components is configured to perform the data monitoring, such that the network component is configured as a packet probe device.

Figure 3:
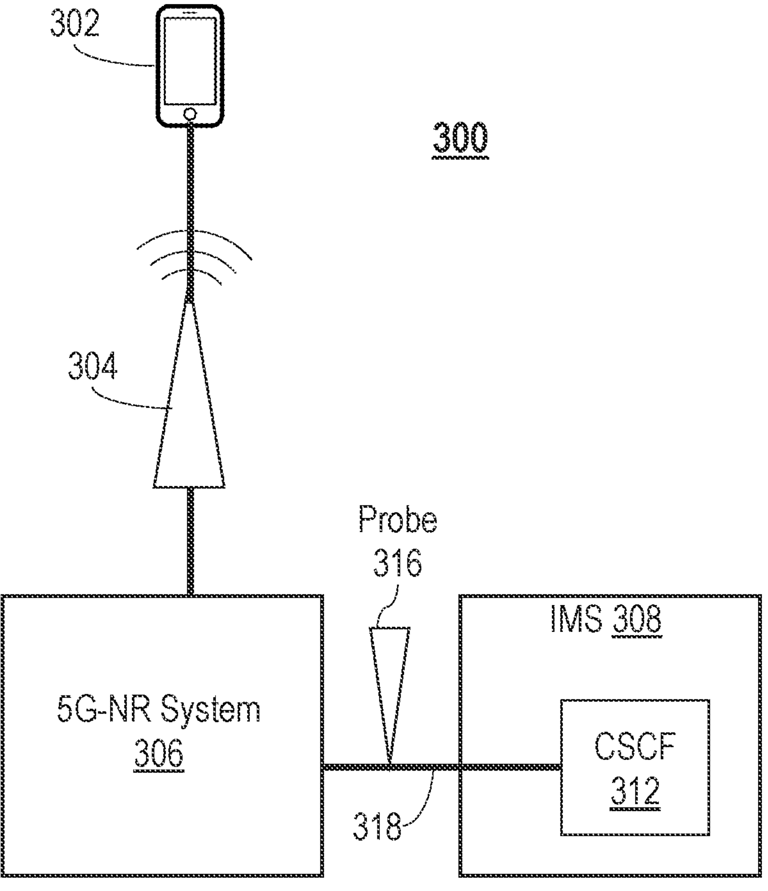
FIG. 3 is a diagram illustrating a portion of an example 5G cellular network.

FIG. 3 illustrates a 5G network environment 300 in which various network components are illustrated; it will be understood that, for clarity, these components are not exhaustive of all components of the 5G network environment 300, and other component(s), not shown, may receive/transfer voice data in addition to, or instead of, the illustrated component (s).

The 5G network environment 300 includes UE 302 that is engaging in a voice call; a 5G base station 304; the 5G-New Radio (NR) system 306; and the IMS 308. The 5G-NR system 306 can include, for example, the 5G-NR Core (5GC). Within the 5G-NR system 306, various module(s) can interface with the IMS 308. For example, a user plane function (UPF) and a policy control function (PCF) can be configured as interconnect points between the 5G-NR system 306 and the IMS 308. The UPF can be configured to perform, for example, encapsulation and decapsulation according to the General Packet Radio Service (GPRS) Tunneling Protocol; packet routing and forwarding; application detection; per-flow quality of service (QOS) handling; and/or traffic usage reporting. The 5G-NR system 306 can further include a session management function (SMF) that interacts with the UPF and/or PCF, e.g., to create, update, and remove Protocol Data Unit (PDU) sessions and to manage session context with the UPF and/or PCF. It will be understood that the 5G-NR system 306 may include various other modules that are not described herein.

Within the IMS 308, a call session function control (CSCF) 312 is configured to perform session control, including, for example, packet routing within/from the IMS 308 and/or session monitoring. The CSCF 312 can include three functional components, which may be separate software and/or hardware modules and/or which may be integrated together: Proxy-Call Session Control Function (P-CSCF), which serves as an access point to the IMS 308 from external network(s); Serving-Call Session Control Function (S-CSCF), which serves as a central node for the provision of Session Initiation Protocol (SIP) data; and Interrogating-Call Session Control Function (I-CSCF), which can guide data to the S-CSCF based on Home Subscriber Server (HSS) data. From the perspective of the UE 302 for an established voice call, the P-CSCF can be the primary/only visible node which receives and forwards packets to appropriate other nodes of the CSCF 312.

In some implementations, the P-CSCF is the first point of contact between the IMS 308 and the 5G-NR system 306, such that probing is performed specifically between the 5G-NR system 306 and the P-CSCF.

Module(s) of the 5G-NR system 306 and the CSCF 312, along with other components of the 5G network environment 300, may be hardware and/or software modules. Moreover, these and other components may be integrated together with other component(s) in software and/or hardware.

Voice data (e.g., in the form of RTP packets) travels generally from the UE 302, to the base station 304, to the 5G-NR system 306 (e.g., mediated by a 5G radio access network (RAN) intermediate between the base station 304 and the 5G-NR system 306), and to the CSCF 312. From the CSCF 312, the packets are appropriately handled/routed to be received by another UE performing a voice call with the UE 302 (not shown). Voice data from the other UE is routed back to the UE 302 on the same route, in the opposite direction.

In some implementations, the monitoring of the data transfer is performed on data that has transferred, is transferring, or will transfer between the 5G-NR system 306 and the IMS 308 (collectively referred to as probing, monitoring, or accessing data "between the 5G-NR system 306 and the IMS 308"). For example, the first network device can be a network device included in the 5G-NR system 306, and the second network device can be a network device included in the IMS 308. For example, the monitoring can be performed on packets received at the 5G-NR system 306 and/or the CSCF 312.

For example, in some implementations the CSCF 312 and/or a module of the 5G-NR system that communicates with the CSCF 312 is configured (as a packet probe device) to probe packets carrying audio data, the packets being packets received at the 5G-NR system 306 from the base station 304, sent from the 5G-NR system 306 to the IMS 308, received at the CSCF 312 from the 5G-NR system 306, and/or sent from the CSCF 312 to the 5G-NR system 306. Monitoring data at this portion of the 5G network environment 300 may be advantageous, because the packet probe device can access data associated with an entire voice call, regardless of changes in call handling during the voice call. For example, during the course of a voice call, the UE 302 may access multiple base stations 304, such that monitoring packet data between the UE 302 and a base station 304, or between a base station 304 and the 5G-NR system 306, may result in incomplete data. However, the 5G-NR system 306 and the IMS 308 are expected to handle the entire voice call, such that, when the cellular data is monitored between the 5G-NR system 306 and the IMS 308, accessed data is expected to provide a full picture of voice data packet transfer. In accordance with some of these implementations, the CSCF 312 can be both the first network device or the second network device, and can also be the packet probe device configured to monitor data transfer.

In some cases, there are further technical benefits associated with monitoring cellular data between the 5G-NR system 306 and the IMS 308. For example, the cellular network components associated with data transfer between the 5G-NR system 306 and the IMS 308 may be particularly well-suited to this analysis, aiding in probe efficiency, e.g., to decrease probe latency and/or decrease computational resources consumed for the monitoring. For example, a module of the 5G-NR system 306 can be configured to perform packet routing. This can include applying a Packet Forwarding Control Protocol (PFCP) protocol, e.g., identifying a Packet Detection Rule (PDR) associated with a packet and applying an instruction set associated with the PDR to forward the packet appropriately. Other packet-processing-related operations that can be performed by the 5G-NR system 306 include processing packets according to Buffering Action Rules (BARs), marking according to QoS Enforcement Rules (QERs) and reporting according to Usage Reporting Rules (URRs). Monitoring of the data transfer (202) can be performed as part of one or more of these operations. For example, in a PFCP routine, packets of voice data associated with a particular voice call can be identified based on the packets' PDR, and the PDR can be an example of the information pertaining to the voice data packets. Accordingly, in this example, the information pertaining to the voice data packets can include metadata associated with the packets. As another example, the URRs can include a rule dictating the collection of packet metadata (an example of the information pertaining to voice data packets) for voice calls handled by the 5G-NR system, as indicated by, for example, packet metadata. Because a module of the 5G-NR system 306 is already performing operations associated with packet analysis and routing, the process of further monitoring the packets to obtain the information pertaining to the voice data packets may impose relatively little additional computational burden.

As a further non-limiting example of monitoring data transfer between the 5G-NR system 306 and the IMS 308, in some implementations the CSCF 312 is configured to perform the monitoring. For example, any one or more of the P-CSCF, S-CSCF, and I-CSCF can be configured, as a packet probe device, to probe cellular data routed through/by the CSCF 312 to obtain the information pertaining to the voice data packets. Because the CSCF 312 may already be configured to perform routing functions on incoming packet data, the process of further monitoring the packet data to obtain the information pertaining to the voice data packets may impose relatively little additional computational burden. For example, the P-CSCF can be configured to obtain counts of transmitted and received voice data packets (examples of metadata) corresponding to an audio call. The UE 302 discovers an address associated with the P-CSCF and uses the P-CSCF as an entry point for packets of the audio call, such that the P-CSCF can monitor the packet flows and obtain the counts.

One or more other element(s) of the 5G-NR system 306 and/or the IMS 308 can instead, or additionally, be configured to perform data monitoring.

Instead, or additionally, a separate packet capture device 316 can be installed to monitor traffic on the connection path 318 between the 5G-NR system 306 and the IMS 308. The packet capture device 316 can be configured to intercept and/or obtain packets carrying voice data in one or both directions between the 5G-NR system 306 and the IMS 308. For example, the packet capture device 316 may be in-line on the connection path 318 (e.g., as a Terminal Access Point (TAP)) and/or configured for port mirroring (SPAN). For example, a SPAN probe can be installed into a network device of the 5G-NR system 306 and/or the IMS 308, obtain packets sent between the 5G-NR system 306 and the IMS 308, and analyze the packets.

In some implementations, the cellular data transfer is monitored at different locations to obtain data about the states of the packet flows in the different directions. As a non-limiting example, a module of the 5G-NR system 306 can probe packets traveling from the UE 302 to the other UE, and the CSCF 312 can probe packets traveling from the other UE to the 5G-NR system 306.

In some implementations, monitoring the data transfer is performed at least partially by a drive test, e.g., using wireless network/packet analysis equipment that is navigated about an area. In an example of a drive test, mobile originating (MO) and/or mobile terminating (MT) equipment is used to perform a voice call, and a session initiation protocol (SIP) log and/or an RTP log are obtained corresponding to the voice call. The log(s) can be used to identify a one-way audio period. For example, the log(s) can include, or can be analyzed to determine, metrics characterizing packet flow (e.g., transmitted/received packet counts) as described in reference to process 200. Moreover, because of the mobility associated with a drive test, in some implementations, the use of a drive test to obtain the information pertaining to voice data packets can assist in identifying geographic areas that are particularly prone to one-way audio calls.

The information pertaining to the voice data packets can include, in various implementations, metadata of packets carrying voice data; the packets themselves (e.g., data inside the packets, such as by performing packet inspection to determine originating and/or receiving UE); routing data associated with the packets, e.g., routing instructions that indicate the packets' inclusion in a voice call; and/or other data that indicates states of packet flows in both directions between two UE engaging in a voice call. In some implementations, a packet probe device obtains packet data in a PCAP format. Monitoring the cellular data can include, for example, counting numbers of voice packets sent in each direction over a period of time.

Referring again to the process 200, the information pertaining to the voice data packets is analyzed (204) to obtain (i) a set of first metrics characterizing a first flow of voice data packets from the first mobile device to the second mobile device and (ii) a set of second metrics characterizing a second flow of voice data packets from the second mobile device to the first mobile device. The analysis can be performed by one or more modules that monitor the data transfer to obtain the information pertaining to the voice data packets (e.g., CSCF 312), and/or can be performed by another cellular network module. In various implementations, the analysis can be performed by a component of the 5G-NR system 306, a centralized unit (e.g., gNB-CU) of the cellular network, a distributed unit (e.g., gNB-DU) of the cellular network, and/or a RAN intelligent controller (RIC) of the cellular network.

For example, as shown in FIG. 4, an example of output data 400 from the analysis includes, associated with corresponding time stamps 402, a number of transmitted packets 404 (e.g., packets from UE 102*a* to UE 102*b* in the example of FIG. 1), a number of received packets 406 (e.g., packets from UE 102*b* to UE 102*a*), transmitted/received packet loss percentage, and jitter 410. The packet counts 404, 406 can be, for example, a number of packets transmitted/received between two adjacent time stamps 402, an average number of packets transmitted/received (e.g., per unit of time) between two adjacent time stamps 402 or in a period of time around each time stamp 402, or another metric. The packet counts 404, 406 are examples of first metrics and second metrics, respectively, in element 204 of the process 200. In this example, the output data 400 is obtained with a time-step of one second, as reflected in the time stamps 402.

Referring again to FIG. 2, based at least on a subset of the first metrics and a subset of the second metrics, it is identified that the first flow of voice data packets is disrupted over a particular time period of a threshold duration, and the second flow of voice data packets is substantially undisrupted over the particular time period (206). The identification can be performed, for example, by a computer system, such as a component of the 5G-NR system 306, a centralized unit of the cellular network, a distributed unit of the cellular network, and/or a RIC of the cellular network. "Disrupted," as used herein, refers to situations in which a flow of voice data packets is partially or fully stopped, e.g., to the extent that the UE on the receiving side of the flow of voice data packets does not output audio of the voice call.

In the example of FIG. 4, the subset of the first metrics and the subset of the second metrics include at least data 408, corresponding to a particular time period 412. During this particular time period 412, no packets are successfully transmitted (as indicated by the number of transmitted packets 404), while at least some packets are successfully received (as indicated by the number of received packets 406). This scenario is an example of a one-way audio call event, and the particular time period can be identified as a one-way audio period (208), e.g., by a computer system, such as a component of the 5G-NR system 306, a centralized unit of the cellular network, a distributed unit of the cellular network, and/or a RIC of the cellular network.

For example, to identify that the first flow of voice data packets is disrupted over a particular time period of a threshold duration, and the second flow of voice data packets is substantially undisrupted over the particular time period, the number of transmitted packets 404 can be compared to the number of received packets 406 to identify time-points at which one of the two packet counts 404, 406 (but not both) is zero. The packet counts 404, 406 are compared at matching times/matching time periods. A series of consecutive such times can be identified as a one-way audio period. In some implementations, the one-way audio period has at least a threshold duration. For example, the threshold duration can be between two seconds and five seconds. If the particular time period has a duration of at least the threshold duration, a one-way audio period is identified. If the particular time period has a duration less than the threshold duration, a one-way audio period is not identified.

In some implementations, the first metrics and the second metrics are synchronized with one another to facilitate comparisons between the packet data at the same time. For example, the as-obtained information pertaining to the voice data packets for the first flow of voice data and the second flow of voice data, respectively, may be referenced to different time-points (e.g., 12:32:17, 12:32:18 for the first flow and 12:32:17.5, 12:32:18.5 for the second flow) and/or over different time durations (e.g., 12:32:17, 12:32:18, 12:32:19 (one packet count per second) for the first flow and 12:32:17, 12:32:19 (one packet count per two seconds) for the second flow). Accordingly, in some implementations, one or both of the metrics can be obtained such that the first and second metrics (i) are referenced to a matching set of times and/or (ii) are referenced to matching measurement periods/times, to facilitate correlated comparisons between equivalent sets of numbers. For example, the duration of the one-way audio period can be determined using a common time structure, to determine whether the duration is at least the threshold duration.

The methods of identifying one-way audio calls described herein differ from many existing network analysis techniques. For example, network logs typically include indicators of dropped calls, with dropped call detection being built-in to cellular networks by default, e.g., without packet monitoring to identify dropped calls. Such logs do not include indicators of one-way audio calls. By contrast, for purposes of the present disclosure, it has been recognized that one-way audio calls present a particular challenge to user experience, and network data monitoring methods are presented based on that recognition. Moreover, for purposes of the present disclosure, it has been recognized that packet-monitoring methods such as those described herein allow one-way audio calls to be differentiated from other network failures, e.g., muting, thereby facilitating more accurate network diagnosis and correction.

Referring again to the process 200, at least one parameter of the cellular network is altered based on the identification of the one-way audio period (210). For example, the altered parameter(s) may be related to one-way audio calls, such that the parameter(s) can be altered to decrease occurrence of future one-way audio calls.

Non-limiting examples of parameters that can be altered include one or more radio link failure (RLF) timer durations; radio resource control (RRC) reestablishment rate; an A3 parameter, e.g., A3 offset and/or A3 TimetoTrigger; a B2 threshold; and/or a codec used for voice calls. RLF timers (e.g., T311, N311, T310, and N310) dictate how long UE will wait in a condition, or attempt to perform a task, before taking an action in response. For example, a T310 timer starts when UE detects a PHY-layer-related problem, and, upon expiry of the T310 timer, the UE can initiate a connection reestablishment procedure. In some implementations, an RLF timer duration is decreased based on the identification of the one-way audio period, which may result in connection problems being detected more quickly, reducing one-way audio call occurrence.

The RRC reestablishment rate refers to the rate at which UE and/or a network component attempts to reestablish a lost cellular link. In some implementations, the RRC reestablishment rate is decreased based on the identification of the one-way audio period, which may decrease opportunities for link failures associated with one-way audio calls.

A3 parameters relate to cell-to-cell handovers which may be associated with one-way audio calls, while B2 parameters relate to inter-technology handovers. Accordingly, adjustment of one or more of A3 and/or B2 parameter(s) can reduce occurrence of one-way audio calls.

To achieve high voice call reliability, some implementations according to this disclosure can adjust a codec to achieve codec alignment between the UE and the cellular network, e.g., the base station. For example, based on identification of the one-way audio period, a codec selection by the UE and/or the cellular network can be adjusted to achieve matching codecs.

The parameter(s) can be altered for one or both UEs participating in the voice call on which the one-way audio period occurred, and/or the parameter can be adjusted over a portion of the cellular network, e.g., over a geographic area in which one or both UEs was located during the one-way audio period and/or for a base station in use on the voice call.

In some implementations, the aforementioned adjustment of at least one parameter is performed automatically, e.g., by a computer system of the cellular network. For example, a computer system of (or communicably connected to) the base station 304 and/or the 5G-NR system 306 can identify the one-way audio period and apply one or more computational methods to determine (i) which parameter(s) to adjust and/or (ii) how to adjust the parameter(s). Examples of the computer system include a component of the 5G-NR system 306, a centralized unit of the cellular network, a distributed unit of the cellular network, and/or a RIC of the cellular network.

For example, the computer system can apply an algorithm or a trained machine learning network, e.g., a neural network. The algorithm or the trained machine learning network can be provided, as input, data characterizing the one-way audio period, e.g., a duration of the one-way audio period, identifiers of UEs included on the voice call, network condition(s)/parameters during the one-way audio period (such as the first and second metrics), and/or the like. The algorithm or the trained machine learning network can output adjustment(s) to the parameter(s), and the computer system and/or another computer system can adjust the parameter(s) based on the input data. In some implementations, time-dependent jitter (as shown for jitter 410 in FIG. 4) during the one-way audio period is analyzed to determine the adjustment of the at least one cellular network parameter, for example, because the jitter may indicate which parameter (s) should be adjusted to correct the one-way audio effects.

In some implementations, data obtained from a drive test (e.g., an SIP log and/or an RTP log) and data obtained from a packet probe device are jointly analyzed to obtain metrics characterizing packet flow, identify one-way audio periods, and alter parameter(s) of a cellular network. For example, in some implementations, data obtained from a packet probe device provides additional detail (e.g., protocol-level signaling data) that may be absent from log data obtained from a drive test. Accordingly, a drive test can be used to initially identify a one-way audio period, and, in response, probed packet data can be used to diagnose network problems and determine solutions.

Figure 5:
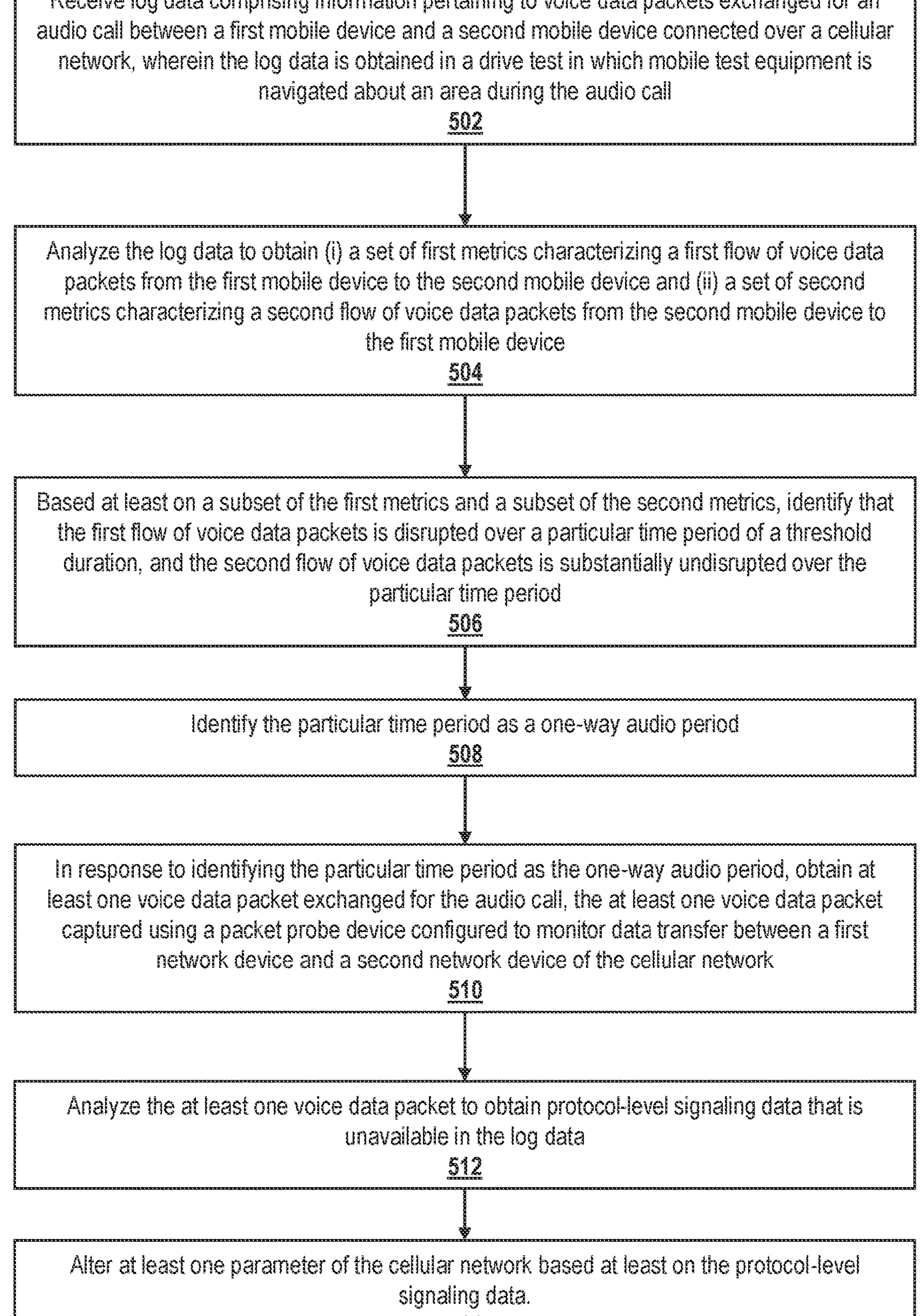
FIG. 5 is a diagram illustrating an example of a process according to some implementations of the present disclosure.

For example, FIG. 5 illustrates an example of a process 500 for one-way audio period identification and cellular network adjustment. The process 500 can be performed, for example, by any one or more of the entities described as performing the process 200.

In the process 500, log data, including information pertaining to voice data packets exchanged for an audio call between a first mobile device and a second mobile device connected over a cellular network, is obtained (502). The log data is obtained in a drive test in which mobile test equipment is navigated about an area during the audio call. For example, MO and/or MT equipment can be used to perform the audio call as the equipment is driven or walked around a geographic area, such as a cell of a 4G, 5G, or other cellular network. The log data can include, for example, an RTP log and/or an SIP log. For example, the first mobile device or second mobile device can be the mobile test equipment used in the drive test.

The log data is analyzed to obtain (i) a set of first metrics characterizing a first flow of voice data packets from the first mobile device to the second mobile device and (ii) a set of second metrics characterizing a second flow of voice data packets from the second mobile device to the first mobile device (504). The metrics can be the metrics described in reference to element 204, such as transmitted and received packet counts for the audio call, e.g., counts 404, 406.

Based at least on a subset of the first metrics and a subset of the second metrics, it is identified that the first flow of voice data packets is disrupted over a particular time period of a threshold duration, and the second flow of voice data packets is substantially undisrupted over the particular time period (506). The particular time period is identified as a one-way audio period (508). These portions of the process 500 can be performed as described in reference to elements 206, 208.

In response to identifying the particular time period as the one-way audio period, at least one voice data packet exchanged for the audio call is obtained (510). The at least one voice data packet is captured using a packet probe device configured to monitor data transfer between a first network device and a second network device of the cellular network. For example, the packet probe device can have characteristics as described in reference to FIG. 3, e.g., can be probe 316 and/or can be integrated into a module of the 5G-NR system 306 and/or CSCF 312. This portion of the process 500 can represent a cross-referencing/correlation process, in which, based on the general identification of the one-way period, more detailed data is desired and obtained. The detailed data may not be present in the log data from the drive test, but may be obtainable using packet probing. The at least one voice data packet can have a timestamp matching time(s) of the identified one-way audio period, so that relevant voice data packet(s) are analyzed.

The at least one voice data packet is analyzed to obtain protocol-level signaling data that is unavailable in the log data (512). For example, the at least one voice data packet can be obtained in PCAP format and can be analyzed using a tool such as Wireshark. The analysis can include, for example, filtering by one or more protocols, filtering by one or more Internet Protocol (IP) addresses associated with the audio call, and/or filtering by one or more other relevant attributes. As a result, protocol-level signaling data such as stream control transmission protocol (SCTP) heartbeat data; F1AP/RRC setup data; SCTP, NG application protocol (NGAP), non-access-stratum for 5G (NAS-5GS), and/or F1AP/RRC selective acknowledgement (SACK) data; service request data associated with SCTP, F1AP, RRC, etc. protocols; NGAP data such as service request data and/or UE message data; and/or other protocol-level signaling data. It will be understood that other examples of protocol-level signaling data are also within the scope of this disclosure. One or more of these or other data types may be unavailable in the log data, which in some implementations may be limited to packet flow data such as transmitted/received packet counts.

In some cases, the packet-level analysis of element 512 may be computationally infeasible to perform for all cellular network data. However, according to some implementations of this disclosure, the packet-level analysis is targeted based on the results of the drive test, such that the packet-level analysis is performed specifically for packet(s) of voice calls on which a one-way audio period has already been identified. Accordingly, cellular network efficiency can be improved.

At least one parameter of the cellular network is altered based at least on the protocol-level signaling data (514). For example, based on the protocol-level signaling data, one or both of (i) which parameter(s) to alter and (ii) how to alter the parameter(s) can be determined. Because the protocol-level signaling data may be more detailed than log data from the drive test, the root cause of the one-way audio period can be identified and corrected. The parameters can include any one or more of the parameters described with respect to element 210, and/or other parameters.

In some implementations, the identification that the first flow of voice data packets is disrupted over the particular time period of the threshold duration, and the second flow of voice data packets is substantially undisrupted over the particular time period, is performed based on both log data from a drive test and packet probe data from a packet probe device. For example, the one-way audio period can be identified only if both sources of data indicate the presence of the one-way audio period. This can reduce false-positives of one-way audio period identification which may result, for example, from drive test logs.

Although some of the foregoing examples relate to 5G networks, it will be understood that the described processes can be applied to other network types as well, e.g., 3G, 4G, and next-generation networks.

In some implementations, based on the processes described herein, aggregate measures of one-way audio call occurrence can be determined. For example, the described packet monitoring and analysis can be applied to many voice calls, and a corresponding aggregate metric can be determined, e.g., "percentage of all voice calls that exhibit at least one one-way audio period." Based on such aggregate metrics, network-wide corrections can be made to improve large-scale performance.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed on a system of one or more computers in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on one or more computers having, or configured to communicate with, a display device, e.g., a LCD (liquid crystal display) or organic light-emitting diode (OLED) monitor, a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method, comprising:

receiving, at one or more processing devices, information pertaining to voice data packets exchanged for an audio call between a first mobile device and a second mobile device connected over a cellular network, wherein the information pertaining to the voice data packets is captured using a packet probe device configured to monitor data transfer at an interface between a first network device comprising a cellular core gateway and a second network device comprising an IP Multimedia Subsystem (IMS) node;

analyzing, by the one or more processing devices, the information pertaining to the voice data packets to obtain (i) a set of first metrics characterizing a first flow of voice data packets from the first mobile device to the second mobile device and (ii) a set of second metrics characterizing a second flow of voice data packets from the second mobile device to the first mobile device;

based at least on a subset of the first metrics and a subset of the second metrics, identifying, by the one or more processing devices, that the first flow of voice data packets is disrupted over a particular time period of a threshold duration, and the second flow of voice data packets is substantially undisrupted over the particular time period;

identifying, by the one or more processing devices, the particular time period as a one-way audio period, based on identifying that the first flow of voice data packets is disrupted over the particular time period and the second flow of voice data packets is substantially undisrupted over the particular time period, wherein the one-way audio period corresponds to a one-way call condition characterized by disruption of voice data packet flow in only one direction; and altering, by the one or more processing devices, at least one parameter of the cellular network comprising at least one of a radio link failure (RLF) timer or a radio resource control (RRC) reestablishment rate based at least on the identification of the one-way audio period.

2. The method of claim 1, wherein the packet probe device is configured to monitor the data transfer at a call session function control (CSCF) of the IMS.

3. The method of claim 1, wherein the threshold duration is between two seconds and five seconds.

4. The method of claim 1, wherein the first metrics and the second metrics are aligned in time, and wherein identifying the particular time period as the one-way audio period is based on at least the time-aligned first metrics and second metrics.

5. The method of claim 1, wherein the information pertaining to the voice data packets comprises at least one of:

metadata of the voice data packets;

data within the voice data packets; or routing data associated with the voice data packets.

6. The method of claim 1, wherein, during the particular time period, zero voice data packets flow from the first mobile device to the second mobile device, and at least one voice data packet flows from the second mobile device to the first mobile device.

7. The method of claim 1, comprising:

receiving, at the one or more processing devices, log data obtained in a drive test, the log data comprising information about the first flow of voice data packets and the second flow of voice data packets;

based at least on the log data, identifying, by the one or more processing devices, the particular time period as the one-way audio period, wherein analyzing the information pertaining to the voice data packets is performed in response to identifying the particular time period as the one-way audio period based at least on the log data, and wherein the information pertaining to the voice data packets comprises protocol-level signaling data that is unavailable in the log data obtained in the drive test; and determining, by the one or more processing devices, based at least on the protocol-level signaling data, the at least one parameter of the cellular network to be altered.

8. The method of claim 7, wherein analyzing the information pertaining to the voice data packets comprises filtering voice packet data on one or more protocols.

9. The method of claim 7, wherein the information pertaining to the voice data packets comprises at least one voice data packet in PCAP format.

10. The method of claim 7, wherein the protocol-level signaling data comprises one or more of stream control transmission protocol (SCTP) data; F1AP/radio resource control (RRC) data; NG application protocol (NGAP) data; or non-access-stratum for 5G (NAS-5GS) data.

11. A system comprising:

one or more processing devices; and one or more storage devices storing instructions that, when executed by the one or more processing devices, cause the one or more processing devices to perform operations comprising:

receiving information pertaining to voice data packets exchanged for an audio call between a first mobile device and a second mobile device connected over a cellular network, wherein the information pertaining to the voice data packets is captured using a packet probe device configured to monitor data transfer at an interface between a first network device comprising a cellular core gateway and a second network device comprising an IP Multimedia Subsystem (IMS) node;

analyzing the information pertaining to the voice data packets to obtain (i) a set of first metrics characterizing a first flow of voice data packets from the first mobile device to the second mobile device and (ii) a set of second metrics characterizing a second flow of voice data packets from the second mobile device to the first mobile device;

based at least on a subset of the first metrics and a subset of the second metrics, identifying that the first flow of voice data packets is disrupted over a particular time period of a threshold duration, and the second flow of voice data packets is substantially undisrupted over the particular time period;

identifying the particular time period as a one-way audio period, based on identifying that the first flow of voice data packets is disrupted over the particular time period and the second flow of voice data packets is substantially undisrupted over the particular time period, wherein the one-way audio period corresponds to a one-way call condition characterized by disruption of voice data packet flow in only one direction; and altering at least one parameter of the cellular network comprising at least one of a radio link failure (RLF) timer or a radio resource control (RRC) reestablishment rate based at least on the identification of the one-way audio period.

12. The system of claim 11, wherein the packet probe device is configured to monitor the data transfer at a call session function control (CSCF) of the IMS.

13. The system of claim 11, wherein the operations comprise:

receiving log data obtained in a drive test, the log data comprising information about the first flow of voice data packets and the second flow of voice data packets;

based at least on the log data, identifying the particular time period as the one-way audio period, wherein analyzing the information pertaining to the voice data packets is performed in response to identifying the particular time period as the one-way audio period based at least on the log data, and wherein the information pertaining to the voice data packets comprises protocol-level signaling data that is unavailable in the log data obtained in the drive test; and determining based at least on the protocol-level signaling data, the at least one parameter of the cellular network to be altered.

14. One or more non-transitory computer-readable storage media encoded with computer program instructions that, when executed by one or more computers, cause the one or more computers to perform operations comprising:

receiving information pertaining to voice data packets exchanged for an audio call between a first mobile device and a second mobile device connected over a cellular network, wherein the information pertaining to the voice data packets is captured using a packet probe device configured to monitor data transfer at an interface between a first network device comprising a cellular core gateway and a second network device comprising an IP Multimedia Subsystem (IMS) node;

analyzing the information pertaining to the voice data packets to obtain (i) a set of first metrics characterizing a first flow of voice data packets from the first mobile device to the second mobile device and (ii) a set of second metrics characterizing a second flow of voice data packets from the second mobile device to the first mobile device;

based at least on a subset of the first metrics and a subset of the second metrics, identifying that the first flow of voice data packets is disrupted over a particular time period of a threshold duration, and the second flow of voice data packets is substantially undisrupted over the particular time period;

identifying the particular time period as a one-way audio period, based on identifying that the first flow of voice data packets is disrupted over the particular time period and the second flow of voice data packets is substantially undisrupted over the particular time period, wherein the one-way audio period corresponds to a one-way call condition characterized by disruption of voice data packet flow in only one direction; and altering at least one parameter of the cellular network comprising at least one of a radio link failure (RLF) timer or a radio resource control (RRC) reestablishment rate based at least on the identification of the one-way audio period.

15. The one or more non-transitory computer-readable storage media of claim 14, wherein the packet probe device is configured to monitor the data transfer at a call session function control (CSCF) of the IMS.

16. The one or more non-transitory computer-readable storage media of claim 14, wherein the operations comprise:

receiving log data obtained in a drive test, the log data comprising information about the first flow of voice data packets and the second flow of voice data packets;

based at least on the log data, identifying the particular time period as the one-way audio period, wherein analyzing the information pertaining to the voice data packets is performed in response to identifying the particular time period as the one-way audio period based at least on the log data, and wherein the information pertaining to the voice data packets comprises protocol-level signaling data that is unavailable in the log data obtained in the drive test; and determining, based at least on the protocol-level signaling data, the at least one parameter of the cellular network to be altered.

* * * * *